(12) United States Patent
Chakraborty et al.

(10) Patent No.: US 11,494,805 B2
(45) Date of Patent: *Nov. 8, 2022

(54) RECOMMENDATIONS BASED ON PRIVATE DATA USING A DYNAMICALLY DEPLOYED PRE-FILTER

(71) Applicant: Maplebear Inc., San Francisco, CA (US)

(72) Inventors: Supriyo Chakraborty, White Plains, NY (US); Keith Grueneberg, Stewart Manor, NY (US); Bongjun Ko, Harrington Park, NJ (US); Christian Makaya, Summit, NJ (US); Jorge J. Ortiz, Rego Park, NY (US); Swati Rallapalli, Ossining, NY (US); Theodoros Salonidis, Wayne, PA (US); Rahul Urgaonkar, Rye, NY (US); Dinesh Verma, New Castle, NY (US); Xiping Wang, Scarsdale, NY (US)

(73) Assignee: Maplebear Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,395

(22) Filed: Feb. 24, 2020

(65) Prior Publication Data
US 2020/0193478 A1     Jun. 18, 2020

Related U.S. Application Data

(63) Continuation of application No. 14/942,618, filed on Nov. 16, 2015, now Pat. No. 10,636,056.

(51) Int. Cl.
*G06Q 30/00* (2012.01)
*G06Q 30/02* (2012.01)

(52) U.S. Cl.
CPC ................ *G06Q 30/0255* (2013.01)

(58) Field of Classification Search
CPC .................................................. G06Q 30/0255
See application file for complete search history.

(56) References Cited

U.S. PATENT DOCUMENTS

| | | |
|---|---|---|
| 6,182,050 B1 | 1/2001 | Ballard |
| 6,205,963 B1 | 9/2001 | Jenkins |
| 6,327,574 B1 | 12/2001 | Kramer et al. |

(Continued)

OTHER PUBLICATIONS

Daniele Riboni, et al., Differentially-Private Release of Check-in Data for Venue Recommendation, 2014 IEEE International Conference on Pervasive Computing and Communications (PerCom), Mar. 24-28, 2014; pp. 190-198.

(Continued)

*Primary Examiner* — Yehdega Retta
(74) *Attorney, Agent, or Firm* — Fenwick & West LLP

(57) ABSTRACT

A method for targeted advertisement includes transmitting a pre-filter to the user device, responsive to contextual information from a user device, to determine, using a processor, one or more inferences based on physical browsing information, collected at the user device, in compliance with one or more privacy policies of the user. The method also includes receiving one or more inferences determined by the pre-filter from the user device and transmitting one or more targeted advertisements to the user device based on one or more inferences.

18 Claims, 5 Drawing Sheets

(56) References Cited

U.S. PATENT DOCUMENTS

| | | |
|---|---|---|
| 7,893,961 B2 | 7/2011 | Chang et al. |
| 2001/0049620 A1 | 12/2001 | Blasko |
| 2010/0293050 A1 | 11/2010 | Maher et al. |
| 2010/0293058 A1 | 11/2010 | Maher et al. |
| 2014/0244386 A1* | 8/2014 | Mathur .............. G06Q 30/0255 |
| | | 705/14.53 |
| 2015/0031335 A1 | 1/2015 | Dong et al. |

OTHER PUBLICATIONS

A. Cooper, Report from the Internet Privacy Workshop (RFC6462), An IP.com Prior Art Database Technical Disclosure, Jan. 1, 2012.

Gavin Smyth, et al., Intelligent Control of Browser Tracking, An IP.com Prior Art Database Technical Disclosure, Jan. 10, 2013.

Mell, Peter, et al., "The NIST Definition of Cloud Computing," Sep. 2011, 7 pages.

* cited by examiner

RECOMMENDATIONS BASED ON PRIVATE DATA USING A DYNAMICALLY DEPLOYED PRE-FILTER

BACKGROUND

Technical Field

The present invention relates to advertising and, more particularly, to providing advertising recommendations to users based on physical browsing information in a manner that does not compromise user-privacy yet maximizes utility of the data to the ad-provider.

Description of the Related Art

Targeted advertising based on online browsing data of users is well established. However, recent advances in portable electronics have provided the ability to collect information regarding users' physical browsing data. Physical browsing information includes data based on users' behavior in physical stores and other locations. Physical browsing data includes locations that the user visited, user videos, pictures, audio, etc., and provides a wealth of information if used effectively for targeted advertisements. However, physical browsing data is very sensitive, as it contains private information about the users.

SUMMARY

A method for targeted advertisement includes transmitting a pre-filter to the user device, responsive to contextual information from a user device, to determine, using a processor, one or more inferences based on physical browsing information, collected at the user device, in compliance with one or more privacy policies of the user. The method also includes receiving one or more inferences determined by the pre-filter from the user device and transmitting one or more targeted advertisements to the user device based on one or more inferences.

A method for targeted advertisement includes transmitting a context for a user device to an advertisement provider and receiving a pre-filter from an advertisement provider responsive to the transmitted context. The method also includes determining one or more inferences using a processor by applying the pre-filter to collected physical browsing information, at the user device, in accordance with one or more privacy policies of a user. Additionally, the method includes transmitting the one or more inferences to the advertisement provider, and displaying one or more targeted advertisements at the user device received in response to the one or more inferences.

A system for targeted advertisement includes a server pre-filter module configured to receive contextual information from a user device, to transmit a pre-filter to the user device, responsive to the contextual information, to determine one or more inferences based on physical browsing information, collected at the user device, in compliance with one or more privacy policies of the user, and to receive the one or more inferences determined by the pre-filter from the user device. The system also includes an advertisement module having a processor configured to transmit the one or more targeted advertisements to the user device based on the one or more inferences.

A system for targeted advertisement includes a client pre-filter module that has a processor configured to transmit a context for a user device to an advertisement provider, to receive a pre-filter from an advertisement provider responsive to the transmitted context, to determine one or more inferences by applying the pre-filter to collected physical browsing information, collected at the user device, in accordance with one or more privacy policies of a user, and to transmit the one or more inferences to an advertisement provider. The system also includes an advertisement module configured to receive one or more targeted advertisements from the advertisement provider in response to the one or more inferences and to display the one or more targeted advertisements at the user device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention deploy a pre-filter onto users' devices that filters personal and potentially sensitive information before providing relevant inferences to the advertiser. The pre-filter thereby identifies information that is important to the advertiser—e.g., that the user visits a certain store or purchases a certain brand—without providing actual location data or distributing the user's pictures or videos. Because the sensitive information itself never leaves the user's device, the user's privacy is protected.

The pre-filter is deployed to the user's device on a case-by-case basis, with the specific inferences being formed depending on the particular context. For example, the type of physical data, the type of store, and the type of advertisers are all contributing factors toward determining what pre-filter to use. The user establishes preferences for the pre-filter, which determine what sorts of data the pre-filter can access and send back.

The pre-filter thereby allows advertisement providers the ability to leverage physical analytics data for better targeting. This benefits users by tailoring advertisements to their tastes, providing discounts and coupons for products and services that the users will actually find interesting. In addition, the use of a pre-filter decreases the amount of information that is transmitted back to the advertisement provider, as it puts the processing at the user's device and transmits only the useful part of the information. This further safeguards the user's privacy, as the pre-filter operates only within the boundaries established by the user's preferences.

Physical browsing data is collected by users' personal portable devices, which collect data as users go about their lives. The data may include video, audio, wireless network scans, inertial sensors, etc. All of this information can be used to infer the context of the user. Wearables and other sensing devices then detect if the data is useful for advertising based on the context of the user, and only useful data is acted upon. For example, data collected when the user is in a meeting is less likely to be useful for advertising when compared to data collected when the user is in a shopping mall.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 1:
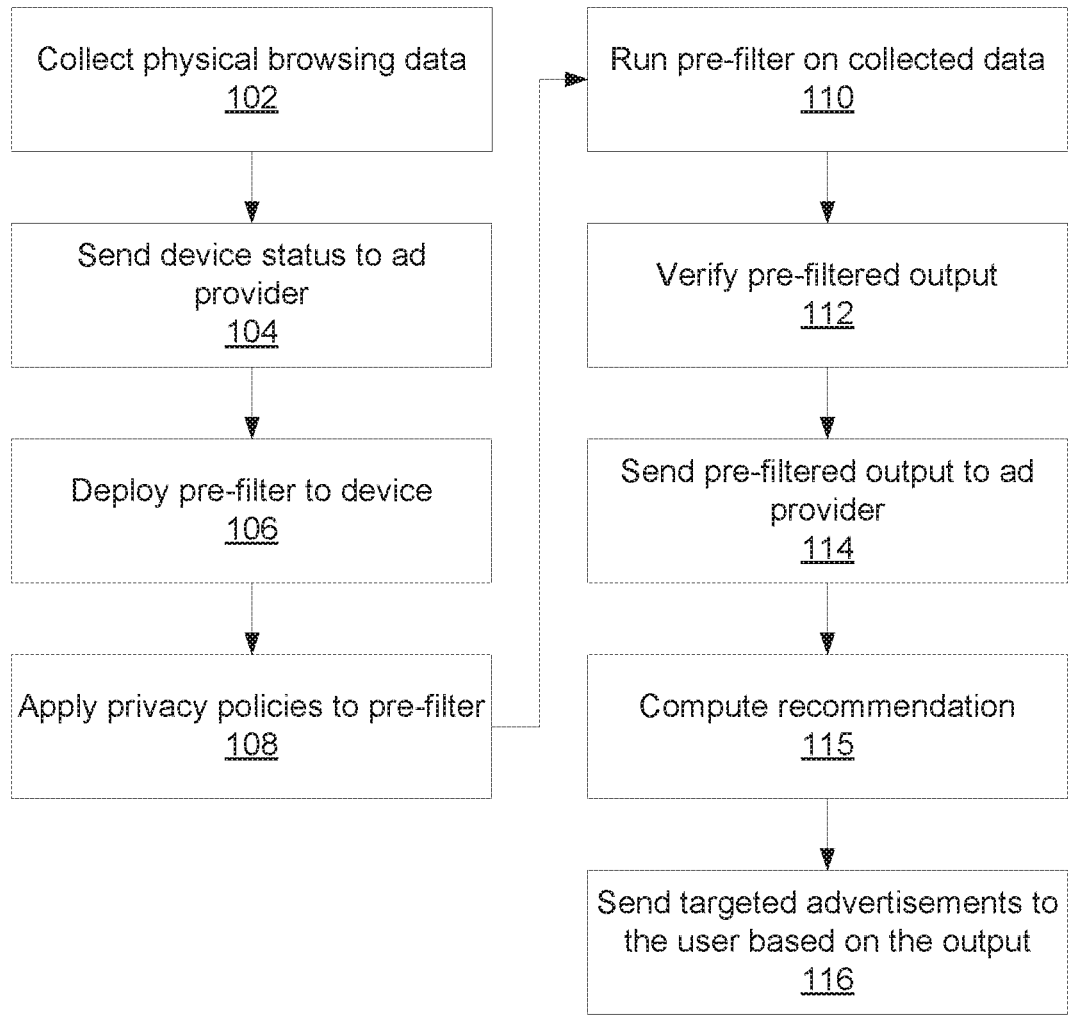
FIG. 1 is a block/flow diagram of a method for targeted advertisement in accordance with the present principles.

Referring now to the drawings in which like numerals represent the same or similar elements and initially to FIG. 1, a method for providing advertising content is shown. Block 102 collects physical browsing data on a user's device, such as a smart phone, wearable device, or tablet. This may include collecting the information using on-board sensors built into the device (e.g., from a camera, wireless network interface, microphone, GPS, or other internal or external sensor) or from a peripheral that has dedicated sensors (e.g., a user's personal fitness/biometric monitor) and sends information to the user's device. In one specific example, the user's wearable device takes a picture in a particular store and transmits that picture to the user's smartphone. Block 102 potentially has access to all data physically available to the device, which makes it possible to identify the user's physical browsing activities. Because this information can be quite sensitive, the user may not wish to share the raw data itself, but may nonetheless want to receive promotional information, such as discounts and coupons, from an ad provider.

Block 104 optionally sends the device's status to the ad provider. This status information may include, e.g., remaining battery power, resource consumption, and processing capabilities of the device. Notably, this information is shared only in accordance with the user's preferences, as the user may not wish to send additional information to the ad provider. In one example, the user's smart phone is low on battery and thus can run only limited computations to avoid the risk of affecting the user's ability to use their device. This information can be used by the ad provider to determine whether to send a computationally intensive pre-filter or to instead send a pre-filter with relatively low computational requirements. If the user does not want to send additional data to facilitate choosing a pre-filter, all the device sends is a "context," for example stating that the user is at a shopping mall, and the type of data available, for example image data, so that the ad-provider is informed when to deploy the pre-filter and what type of processing is needed.

Block 106 deploys a pre-filter to the user's device on demand. The pre-filter that is deployed may be selected based on a variety of factors including, e.g., the user device's status and the ad provider's needs for data (e.g., based on current ad pool, other similar users, etc.). The ad provider deploys the pre-filter best suited to the present circumstances to the user's device. In one example, an object detection pre-filter is deployed to the user's smart phone to recognize objects within a given image. In another example, a text recognition pre-filter is deployed to the user's smart phone to locate known brand names within an image.

Block 108 applies privacy policies to the pre-filter. The user provides a security profile that includes privacy and security preferences. These preferences may be set manually by the user or may, alternatively, be set according to user defaults. In one specific embodiment, the default policies are selected based on the user's other privacy and security settings in, for example, their social media profiles. In addition, the default preferences may be guided by their level of social media activity, with status updates that include physical location indicating that the user does not wish to protect such information as tightly. The settings may include fine-grained controls over privacy, for example prohibiting pictures from being sent to ad providers.

Block 110 runs the pre-filter on the collected data. The pre-filter may take into account a determination of the user's context, for example deciding that the information is not relevant due to the user being located at work. In addition, the privacy and security settings affect the operation of the pre-filter, blocking certain operations and types of information. The pre-filter's operation on the collected data generates one or more inferences about the user's physical browsing data. These inferences are the output of the pre-filter that is useful to the advertisement provider in deciding what advertisement to show. Inferences are useful to help the ad provider know the interests of the user and can be in the form of locations that the user has visited, objects that the user has seen, and activities that the user has performed. In one example, the pre-filter may determine that the user is looking at a watch.

Block 112 verifies the output of the pre-filter. This is accomplished by reconstructing the message as specified by the pre-filter and checking that the output complies with security and privacy policies. Verification checks, for example, that the message only includes the computed inferences and does not include more sensitive information. Following the above example, block 112 would determine that the output includes the inference that the user is interested in watches, but does not include any picture. If the output is compliant with the policies, block 114 then sends the verified output to the ad provider.

Block 115 computes a recommendation of a targeted advertisement based on the pre-filtered output (that output being referred to herein as an "inference") at the advertisement provider. The ad provider sends the recommended advertisements to the user based on the output in block 116. The targeted advertisement may be based on one or more recommendation processes which may be proprietary to the ad provider. Thus the ad provider runs the recommendation process on its own device (or in a cloud computing resource allocated to the ad-provider). This also allows the ad provider to leverage other information that is available, for example by cross-referencing with other users' similar profiles, the current advertiser pool, etc. Thus, in the above example, block 116 may provide the user with a targeted advertisement that includes a watch coupon.

In one particular embodiment, block 116 may employ physical browsing information from other users as well when serving a targeted advertisement to the user. This is possible if the other users share their own physical browsing information and that information correlates with the physical browsing information collected by the user. For example, the ad provider may create a general database of trends across all users, allowing it to make predictions about the user's behavior and preferences from seemingly unrelated behaviors. More directly, if the user is friends with the other users in question and those friends have physical browsing information that shows they are, for example, out shopping with the user, then the ad provider can draw further inferences about the user from the user's friends' physical browsing data.

Figure 2:
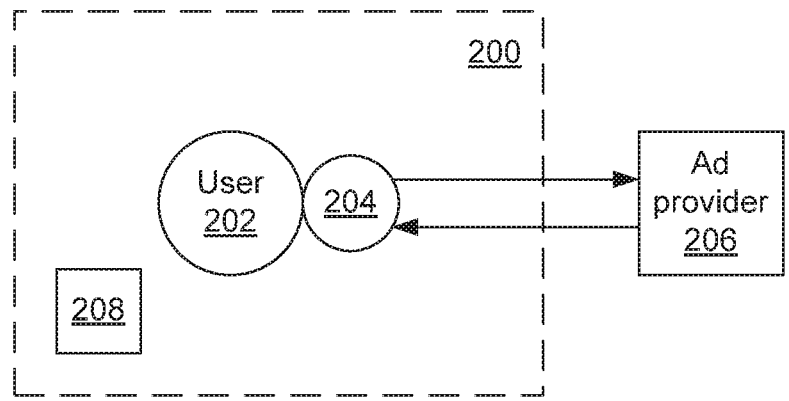
FIG. 2 is a block diagram of a system for targeted advertisement in accordance with the present principles.

Referring now to FIG. 2, a diagram of the relationships between the user and the ad provider is shown. A user 202 lives in a physical context 200. This context 200 includes every place the user 202 visits, every physical activity the user 202 engages in, and every object the user 202 interacts with. The user carries one or more personal devices 204. These devices 204 may be, for example, smart phones or tablets, or they may be wearable devices that stand alone or that operate in conjunction with more powerful devices. As the user 202 interacts with their context 200, the personal device 204 collects information about those interactions. This information may be captured automatically, as in the case of location or biometric monitoring devices, or may be collected at the user's explicit request, such as when the user takes a picture.

In particular, the device(s) 204 record the user's interaction with one or more objects 208 in the context 200. This object may, for example, be a product for sale or a particular store or location. The device(s) 204 collect information about that interaction and apply a pre-filter that was supplied by ad provider 206, which is a remotely based system operating outside the context 200. The device(s) 204 use the pre-filter to make inferences about the user's physical browsing activities locally, such that the collected information itself is not directly supplied to the ad provider 206, in accordance with privacy and security policies located on the device(s) 204 or in the cloud. Once the device(s) 204 produce these inferences, they send the inferences to the ad provider 206.

The ad provider 206 then uses the inferences to determine one or more targeted advertisements. These targeted advertisements are formed in some fashion responsive to the user's interaction with the context 200. In one example, if the pre-filter infers that the user is grocery shopping, the ad provider 206 may supply coupons relating to the user's preferred brands. If the pre-filter infers that the user is at work, the ad provider 206 may supply advertisements relating to getaway vacations. If the user looked at a watch for a long time, then ad provider 206 may supply a coupon for the watch. The ad provider 206 delivers the targeted advertisement to one or more of the personal devices 204 or by some other delivery mechanism, such as through email, physical mail, instant messaging, or through advertisements displayed in a web browser.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
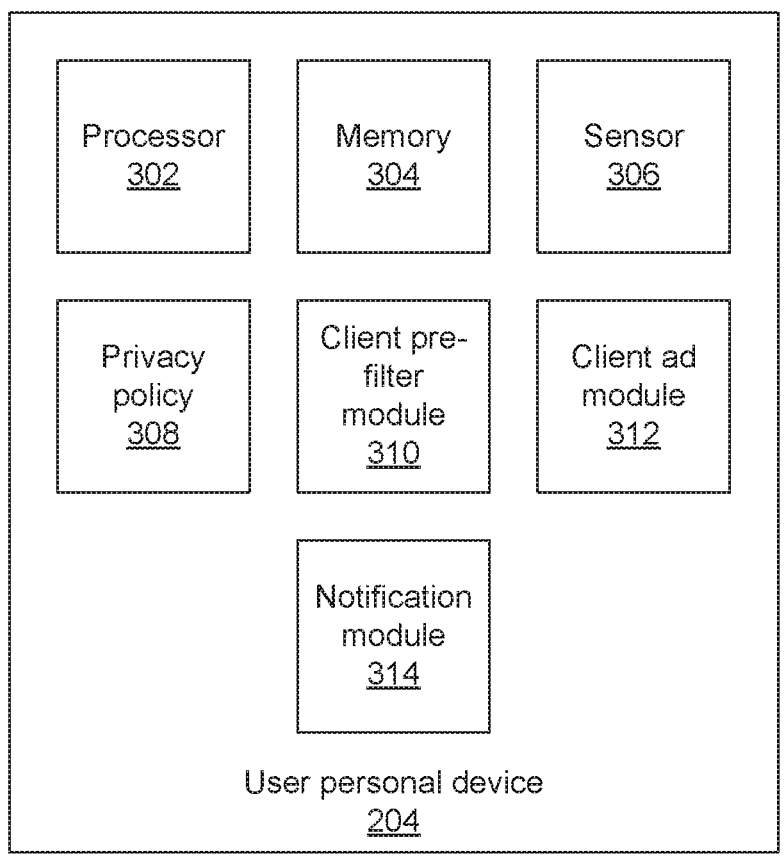
FIG. 3 is a block diagram of a user device part of a system for targeted advertisement in accordance with the present principles.

Referring now to FIG. 3, a user's personal device 204 is shown. The personal device 204 includes a hardware processor 302 and a memory 304. The personal device 204 further includes one or more sensors 306. It should be understood that these sensors may be physically integrated with the personal device 204 itself or may, alternatively, be external sensors that communicate with the physical device 204 by way of wired or wireless communications. In one specific example, the personal device 204 may be a smart phone that includes its own sensors (such as, e.g., a GPS, accelerometer, and camera) and also communicates with an external sensor device such as a wearable biometric monitor.

The personal device 204 includes one or more functional modules. These modules may be implemented as software that is executed by the hardware processor 302 or, alternatively, they may be implemented discretely or together by dedicated hardware components in the form of, e.g., one or more application specific integrated chips or field programmable gate arrays.

The personal device 204 captures and stores information from the sensor 306 in the memory 304. The personal device 204 also stores a privacy and security policy 308 in its memory 304. A notification module 314 sends information to the advertisement provider 206 to inform it that the user is collecting physical browsing information and that a pre-filter can be used. The notification module 314 includes contextual information, which may include some minor, non-private piece of the physical browsing information, to help guide the advertisement provider 206 in determining which pre-filter to send. A client pre-filter module 310 receives a pre-filter from an ad provider 206 and applies it to the stored sensor information to generate one or more inferences. Based on these inferences, the client pre-filter module 310 creates a message or report for the advertisement provider 206 and verifies that the inferences comply with the stored privacy policy 308. The client pre-filter module 310 then sends the message with its inferences to the ad provider 206.

The personal device 204 also includes a client advertisement module 312. The client advertisement module 312 receives communications from the advertisement provider 206 that include targeted advertisements for the user. The client advertisement module 312 instructs the user personal device 204 to provide these targeted advertisements to the user through, for example, a graphical user interface.

Figure 4:
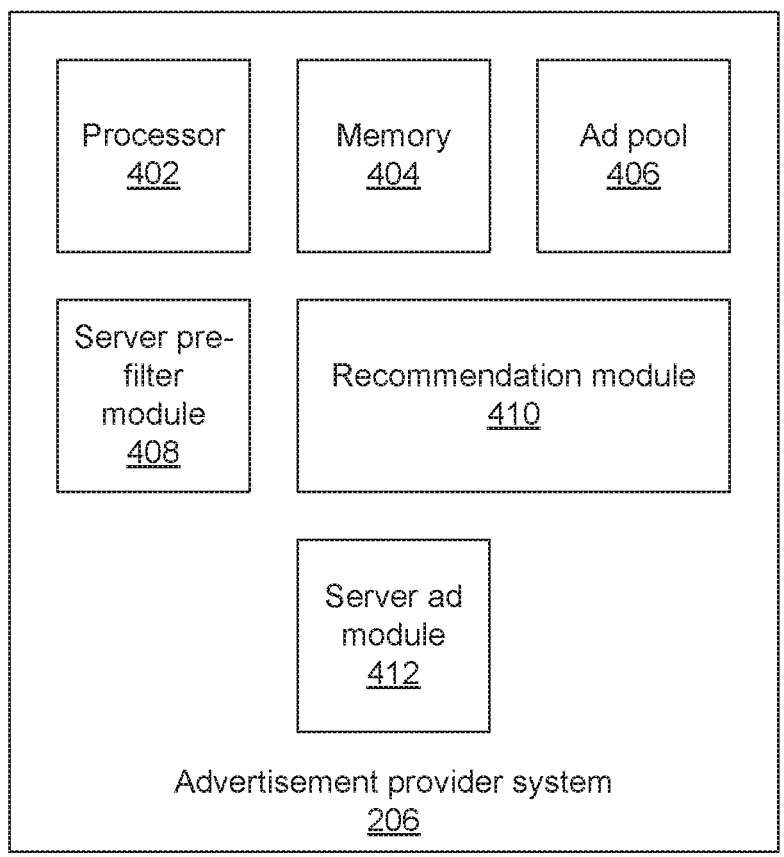
FIG. 4 is a block diagram of an ad-provider part of a system for targeted advertisement in accordance with the present principles.

Referring now to FIG. 4, an advertisement provider system 206 is shown. It should be understood that the advertisement provider system 206 may a single, centralized device or may be implemented in a decentralized fashion in, for example, a cloud computing environment. As above, the advertisement provider system 206 includes a hardware processor 402 and a memory 404. The advertisement provider system 206 includes one or more functional modules. These modules may be implemented as software that is executed by the hardware processor 402 or, alternatively, they may be implemented discretely or together by dedicated hardware components in the form of, e.g., one or more application specific integrated chips or field programmable gate arrays.

The advertisement provider system 206 stores a pool of available advertisements 406 in its memory 404. The system 206 provides pre-filters to a user personal device 204 in accordance with user behavior and the available advertisements in the advertisement pool 406. For example, if an advertisement is to be targeted to users with an interest in watches, the server pre-filter module 408 may supply pre-filters that perform object detection and that search text information for references to watches. This will help save memory on user's device as the models needed for looking only at a sub-set of interesting objects will be smaller. The server pre-filter module 408 will also be more computationally efficient as it looks only for specific data.

Based on inferences received from the pre-filters on the user personal devices 204, a recommendation module 410 determines whether to send an advertisement to a particular user device 204. A server advertisement module 412 then selects an appropriate advertisement from the advertisement pool 406 and transmits the targeted advertisement to the user personal device 204.

Figure 5:
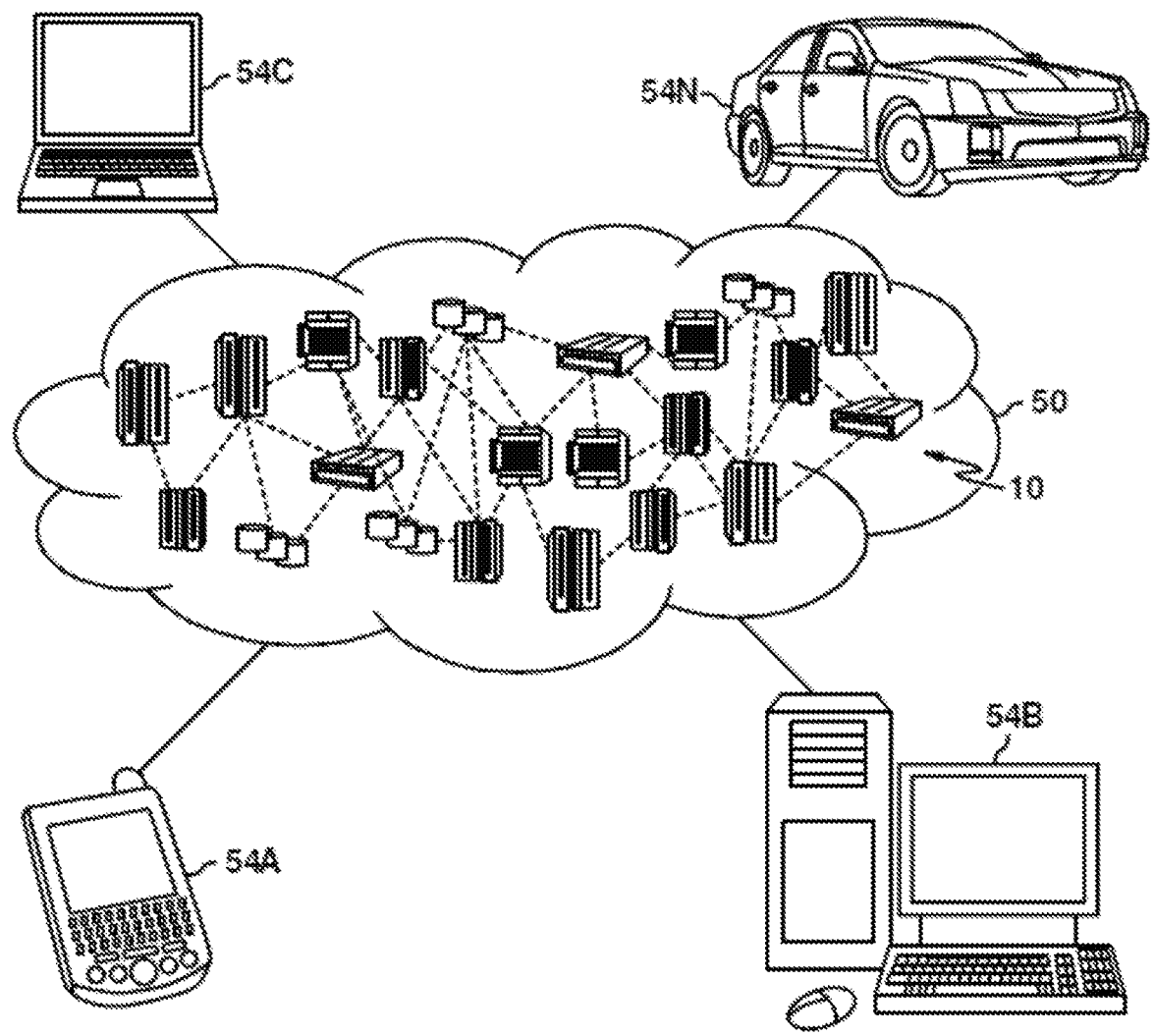
FIG. 5 is a diagram of a cloud computing environment according to the present principles.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
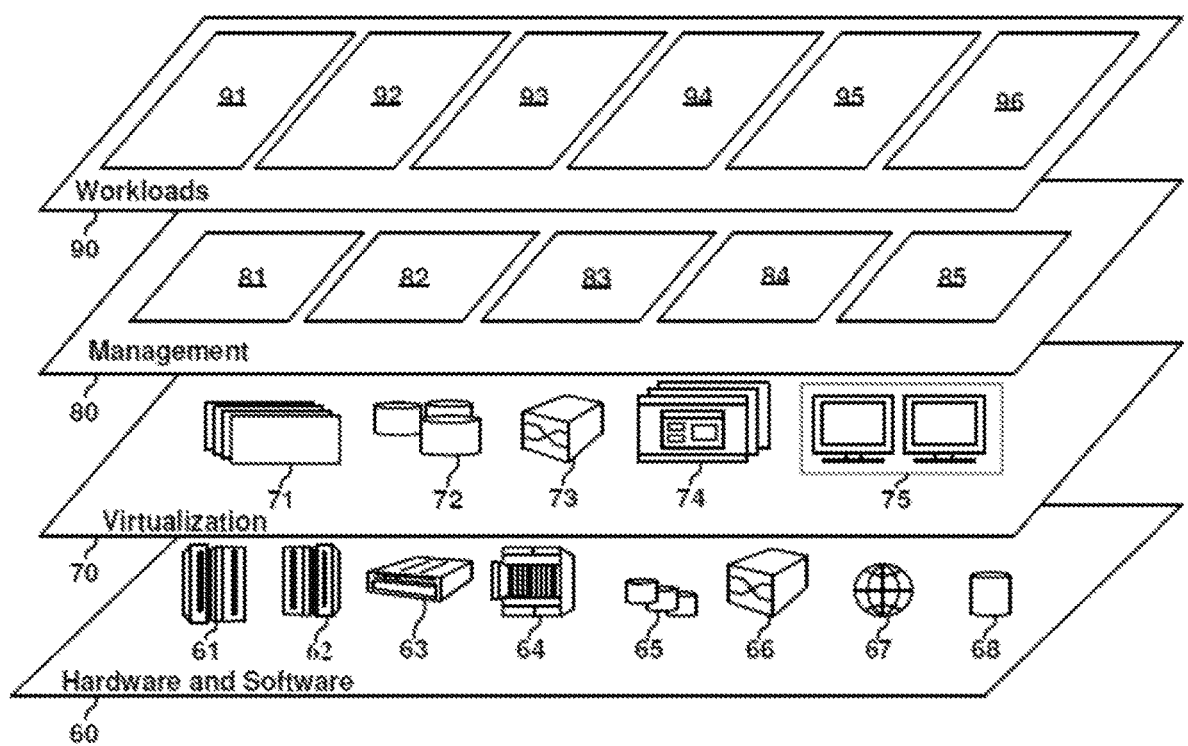
FIG. 6 is a diagram of abstraction model layers according to the present principles.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and targeted advertisement recommendation 96.

Having described preferred embodiments of recommendations based on private data using a dynamically deployed pre-filter (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for targeted advertisement, comprising:
receiving, at a provider system, status information of a user device including one or more selected from a group consisting of: remaining battery power of the user device, resource consumption of the user device, and processing capabilities of the user device;
transmitting a pre-filter from a provider system to the user device, responsive to the provider system receiving contextual information from the user device, the pre-filter selected by the provider system based on the status information of the user device and the pre-filter configured to determine, using a processor of the user device, one or more inferences based on physical browsing information, collected at the user device, in compliance with one or more privacy policies of the user;
receiving the one or more inferences determined by the pre-filter from the user device at the provider system; and
transmitting one or more targeted advertisements from the provider system to the user device based on the one or more inferences,
wherein the pre-filter processes private user information that is protected by the one or more privacy policies to determine the one or more inferences and wherein the one or more inferences do not themselves include the private user information.

2. The method of claim 1, wherein the contextual information comprises one or more pieces of information regarding the user's location and a type of data collected by the user device that is permitted by the privacy policies of the user.

3. The method of claim 1, wherein the contextual information identifies one or more types of physical browsing information collected at the user device and the pre-filter for transmission is selected in accordance with a corresponding type of physical browsing information.

4. The method of claim 1, wherein the one or more inferences comprise analysis outputs based on the physical browsing information and do not include the physical browsing information itself.

5. A method for targeted advertisement, comprising:
transmitting status information of a user device to a provider system, the status information including one or more selected from a group consisting of: remaining battery power of the user device, resource consumption of the user device, and processing capabilities of the user device;
transmitting a context for the user device to an advertisement provider;
receiving a pre-filter from the provider system responsive to the transmitted context and to the status information;
determining one or more inferences using a processor by applying the pre-filter to physical browsing information, collected at the user device, in accordance with one or more privacy policies of a user;
transmitting the one or more inferences to the provider system; and
displaying one or more targeted advertisements at the user device received in response to the one or more inferences,
wherein the pre-filter processes private user information that is protected by the one or more privacy policies to determine the one or more inferences and wherein the one or more inferences do not themselves include the private user information.

6. The method of claim 5, wherein the contextual information comprises one or more pieces of information regarding the user's location and a type of data collected by the user device that is permitted by the privacy policies of the user.

7. The method of claim 5, wherein the contextual information identifies one or more types of physical browsing information collected at the user device and the pre-filter corresponds to a type of physical browsing information.

8. The method of claim 5, wherein the one or more inferences comprise analysis outputs based on the physical browsing information and do not include the physical browsing information itself.

9. A system for targeted advertisement, comprising:
a processor;
a memory;
a server pre-filter module, stored on the memory, comprising instructions to cause the processor to receive status information of a user device including one or more selected from a group consisting of: remaining battery power of the user device, resource consumption of the user device, and processing capabilities of the user device and to receive contextual information from the user device, to transmit a pre-filter to the user device, responsive to the contextual information and to the status information, to determine one or more inferences based on physical browsing information, collected at the user device, in compliance with one or more privacy policies of the user, and to receive the one or more inferences determined by the pre-filter from the user device; and
an advertisement module, stored on the memory, comprising instructions to cause the processor to transmit the one or more targeted advertisements to the user device based on the one or more inferences,
wherein the pre-filter processes private user information that is protected by the one or more privacy policies to determine the one or more inferences and wherein the one or more inferences do not themselves include the private user information.

10. The system of claim 9, wherein the contextual information comprises one or more pieces of information regarding the user's location and a type of data collected by the user device that is permitted by the privacy policies of the user.

11. The system of claim 9, wherein the contextual information identifies one or more types of physical browsing information collected at the user device and the pre-filter for transmission is selected in accordance with a corresponding type of physical browsing information.

12. The system of claim 9, wherein the one or more inferences comprise analysis outputs based on the physical browsing information and do not include the physical browsing information itself.

13. The system of claim 9, wherein the physical browsing information comprises image data collected by one or more cameras at the user device.

14. A system for targeted advertisement, comprising:
a processor;
a memory;
a client pre-filter module, stored on the memory, comprising instructions to cause the processor to transmit status information of a user device including one or more selected from a group consisting of: remaining battery power of the user device, resource consumption of the user device, and processing capabilities of the user device and to transmit a context for a user device to an advertisement provider, to receive a pre-filter from an advertisement provider responsive to the transmitted context and to the transmitted status information, to determine one or more inferences by applying the pre-filter to collected physical browsing information, collected at the user device, in accordance with one or more privacy policies of a user, and to transmit the one or more inferences to an advertisement provider; and
an advertisement module, stored on the memory, comprising instructions to cause the processor to receive one or more targeted advertisements from the advertisement provider in response to the one or more inferences and to display the one or more targeted advertisements at the user device,
wherein the pre-filter processes private user information that is protected by the one or more privacy policies to determine the one or more inferences and wherein the one or more inferences do not themselves include the private user information.

15. The system of claim 14, wherein the contextual information comprises one or more pieces of information regarding the user's location and a type of data collected by the user device that is permitted by the privacy policies of the user.

16. The system of claim 14, wherein the contextual information identifies one or more types of physical browsing information collected at the user device and the pre-filter corresponds to a type of physical browsing information.

17. The system of claim 14, wherein the one or more inferences comprise analysis outputs based on the physical browsing information and do not include the physical browsing information itself.

18. The system of claim 14, wherein the physical browsing information comprises image data collected by one or more cameras at the user device.

* * * * *